United States Patent
Bonwick et al.

(10) Patent No.: US 7,526,615 B2
(45) Date of Patent: Apr. 28, 2009

(54) COMPRESSED VICTIM CACHE

(75) Inventors: Jeffrey S. Bonwick, Los Altos, CA (US); William H. Moore, Fremont, CA (US); Mark J. Maybee, Boulder, CO (US); Matthew A. Ahrens, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 170 days.

(21) Appl. No.: 11/513,863

(22) Filed: Aug. 31, 2006

(65) Prior Publication Data

US 2007/0106847 A1     May 10, 2007

Related U.S. Application Data

(60) Provisional application No. 60/733,403, filed on Nov. 4, 2005.

(51) Int. Cl.
*G06F 12/00* (2006.01)

(52) U.S. Cl. .................................... 711/133
(58) Field of Classification Search ................. 711/133
See application file for complete search history.

(56) References Cited

U.S. PATENT DOCUMENTS

| | | | |
|---|---|---|---|
| 6,678,793 B1 | 1/2004 | Doyle | |
| 6,681,298 B1 * | 1/2004 | Tso et al. | 711/133 |
| 6,684,299 B2 | 1/2004 | Hetherington et al. | |
| 2001/0034814 A1 | 10/2001 | Rosenweig | |
| 2003/0004882 A1 * | 1/2003 | Holler et al. | 705/51 |

* cited by examiner

*Primary Examiner*—Matt Kim
*Assistant Examiner*—John P Fishburn
(74) *Attorney, Agent, or Firm*—Osha • Liang LLP

(57) ABSTRACT

A method for caching a block of data. The method including receiving a request to store the block and determining whether an active cache is able to expand. If the active cache is able to expand, then expanding the active cache to obtain an expanded active cache, and storing the block in the expanded active cache. If the active cache is not able to expand, then determining whether evictable blocks are present in the victim cache. If evictable blocks are present in the victim cache, then evicting a sufficient number of the evictable blocks from the victim cache to facilitate storing the block in the active cache, where the evictable blocks in the victim cache are compressed.

16 Claims, 6 Drawing Sheets

COMPRESSED VICTIM CACHE

CROSS REFERENCE TO RELATED APPLICATIONS

This application claims benefit of U.S. Provisional Application Ser. No. 60/733,403 filed on Nov. 4, 2005, entitled "Adaptive Replacement Cache" in the names of Jeffrey S. Bonwick, William H. Moore, Mark J. Maybee, and Matthew A. Ahrens.

The present application contains subject matter that may be related to the subject matter in the following U.S. patent application, which is assigned to a common assignee: "Adaptive Replacement Cache" (U.S. patent application Ser. No. 11/417,078) filed on May 3, 2006.

BACKGROUND

Traditional systems include a processor, a L1 cache, a L2 cache, and memory. The L1 cache is a form of fast memory (holding recently accessed data), designed to speed up subsequent access to the same data. The L1 cache, specifically, is located on or close to the microchip containing the processor. The L2 cache is similar to the L1 cache except that it contains data that was not as recently accessed as the data in the L1 cache. Additionally, the L2 cache typically has a larger memory capacity and a slower access time.

The memory is typically random access memory (RAM). When a load request is generated on the system, a virtual address is sent from the processor to a corresponding TLB (not shown). The TLB converts the virtual address into a physical address that is subsequently sent to the L1 cache. In one embodiment of the invention, associated with the L1 cache is an L1 cache tag array. The L1 cache tag array is an index of data stored in the L1 cache. If the physical address, sent from the TLB to the L1 cache, is present in the L1 cache tag array, then the datum corresponding to the physical address is retrieved and sent to the processor. If the physical address is not present in the L1 cache tag array, then the L1 cache forwards the physical address to the L2 cache.

If the physical address is found in the L2 cache tag array, then a cache line associated with the physical address is retrieved from the L2 cache and sent to the L1 cache. One skilled in the art will appreciate that the cache line is the unit of transfer between the L2 cache and the L1 cache. Once the L1 cache receives the cache line, the L1 cache retrieves and forwards the requested datum within the cache line to the processor.

If the physical address is not found in the L2 cache tag array, then the L2 cache forwards the physical address to memory. Once the physical address is found in memory, the entire cache line on which the requested datum is located is retrieved and sent to the L2 cache. The L2 cache subsequently forwards the entire cache line to the appropriate L1 cache. Upon receipt of the entire cache line, the L1 cache forwards the requested datum within the cache line to the appropriate processor.

Each of the aforementioned caches (i.e., L1 cache and L2 cache) has a fixed size. Accordingly, a cache may become full (i.e., no more data may be stored in the cache). When a cache becomes full, one or more cache lines must be evicted, prior to loading additional data into the cache.

SUMMARY

In general, in one aspect, the invention relates to a method for caching a block of data. The method includes receiving a request to store the block and determining whether an active cache is able to expand. If the active cache is able to expand, then expanding the active cache to obtain an expanded active cache, and storing the block in the expanded active cache. If the active cache is not able to expand, then determining whether evictable blocks are present in the victim cache. If evictable blocks are present in the victim cache, then evicting a sufficient number of the evictable blocks from the victim cache to facilitate storing the block in the active cache, wherein the evictable blocks in the victim cache are compressed.

In general, in one aspect, the invention relates to a system. The system includes a memory, wherein the memory comprises an active cache and a victim cache. The system is configured to receive a request to store a block of data and determine whether the active cache is able to expand. If the active cache is able to expand, then expand the active cache to obtain an expanded active cache, and store the block in the expanded active cache. If the active cache is not able to expand, then determine whether evictable blocks are present in the victim cache. If evictable blocks are present in the victim cache, then determine whether a total size of the evictable blocks is greater than or equal to a size of the block and evict a sufficient number of the evictable blocks from the victim cache to facilitate storing the block in the active cache, wherein the evictable blocks in the victim cache are compressed.

A computer readable medium comprising instructions for performing a method for caching a block of data. The method includes receiving a request to store the block and determining whether an active cache is able to expand. If the active cache is able to expand, then expanding the active cache to obtain an expanded active cache, and storing the block in the expanded active cache. If the active cache is not able to expand, then determining whether evictable blocks are present in the victim cache. If evictable blocks are present in the victim cache, then evicting a sufficient number of the evictable blocks from the victim cache to facilitate storing the block in the active cache, wherein the evictable blocks in the victim cache are compressed.

Other aspects of the invention will be apparent from the following description and the appended claims.

DESCRIPTION

Figure 1:
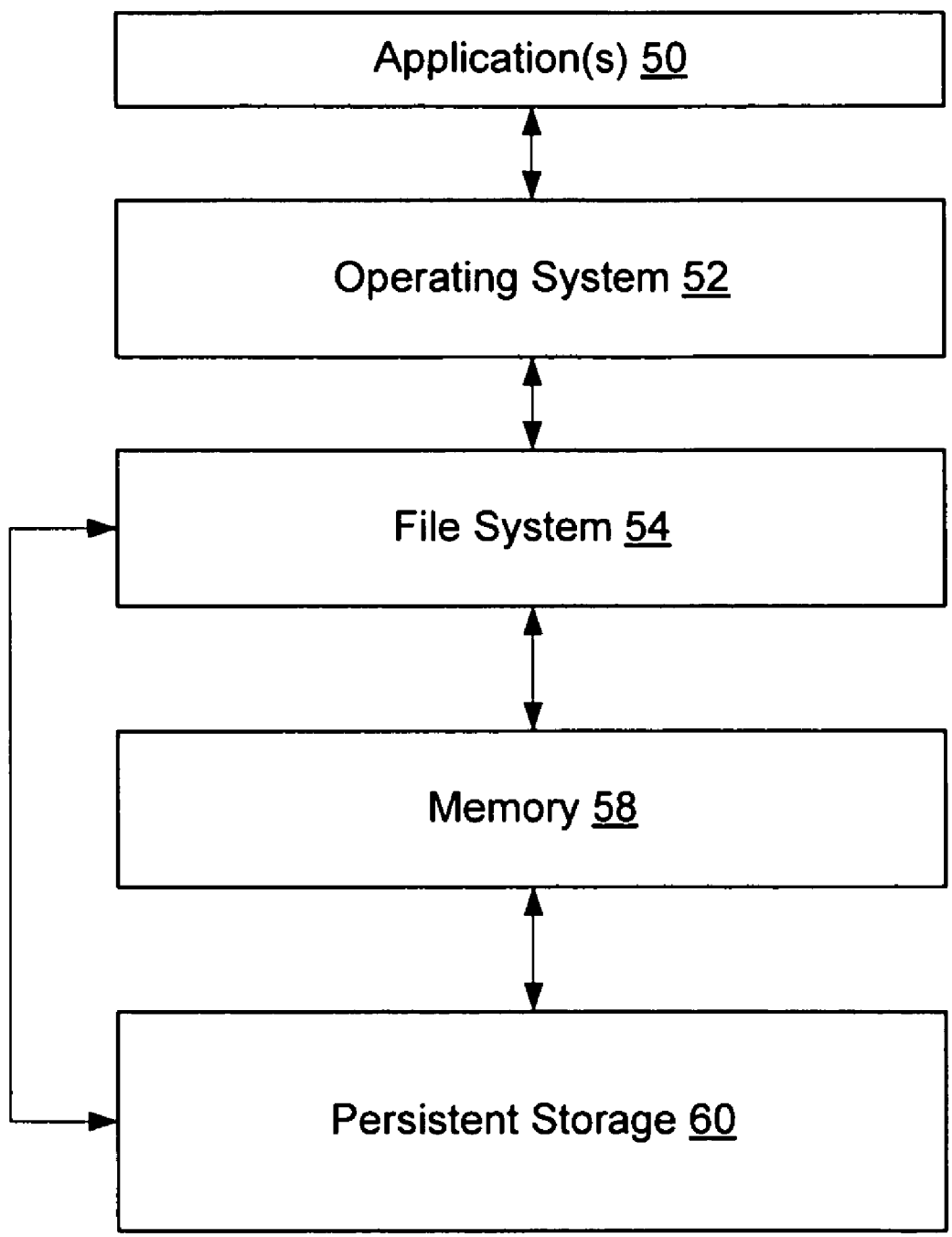
FIG. 1 shows a system in accordance with one embodiment of the invention.

Specific embodiments of the invention will now be described in detail with reference to the accompanying figures. Like elements in the various figures are denoted by like reference numerals for consistency.

In the following detailed description of one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to block caching. More specifically, embodiments of the invention relate to a method for caching blocks in memory, where the memory includes both an active cache portion and a victim cache portion. Various embodiments of the invention are discussed below.

FIG. 1 shows a system in accordance with one embodiment of the invention. As shown in FIG. 1, the system includes one or more applications (50), an operating system (52), a file system (54), a memory (58), and a persistent storage (60). Each of the aforementioned components is discussed below.

In one embodiment of the invention, the application(s) (50) corresponds to any application executing the system. Those skilled in the art will appreciate that the application (50) is not intended to include processes executing in or below the operating system (52) level. As shown in FIG. 1, the application(s) (50) interacts with the operating system (52). The operating system (52) may correspond to any operating system (52) (e.g., Windows®, Solaris®, Linux, etc.) Windows is a registered trademark of the Microsoft Corporation and Solaris is a registered trademark of Sun Microsystems, Inc.

The operating system (52), in turn, interacts with (among other components) the file system (54). In one embodiment of the invention, the file system is configured to provide an interface between the operating system (54) and various data storage mediums (e.g., the memory (58) and persistent storage (60)). The file system (54) includes functionality to obtain data from the memory (58) and persistent storage (60) as well as to store data in the memory (58) and persistent storage (60). In addition, the file system (54) includes functionality to manipulate (directly or indirectly) the organization of data within the memory (58) and/or the persistent storage (60). Examples of file systems include, but are not limited to, the Unix File System (UFS), the Zettabyte File System (ZFS), etc.

In one embodiment of the invention, the memory (58) corresponds to Random Access Memory (RAM) or any other similar type of memory used to temporarily store data that is currently being used by the system or that has recently been used by the system (but currently not being used). The layout of the memory (58) is discussed in FIG. 2. In one embodiment of the invention, the data (or at least some of the data) stored in the memory (58) is stored as blocks of data. In one embodiment of the invention, each block has a minimum size of 512 bytes. Further, in one embodiment of the invention, the data stored (or at least some of the data) stored in the memory (60) is stored in compressed form (i.e., as compressed data). The compression of the data may be performed using compression algorithms well known in the art.

In one embodiment of the invention, persistent storage (60) corresponds to a storage medium configured to persistently store data. Said another way, the data stored such that it is not lost when power is removed from the storage medium. Examples of persistent storage include, but are not limited to, hard disks, compact disks, Flash memory devices (e.g., memory built using NAND and/or NOR gate technology), tape drives, etc. In one embodiment of the invention, the data (or at least some of the data) stored in the persistent storage (60) is stored as blocks of data. In one embodiment of the invention, each block has a minimum size of 512 bytes. Further, in one embodiment of the invention, the data stored (or at least some of the data) stored in the persistent storage (60) is stored in compressed form (i.e., as compressed data). The compression of the data may be performed using compression algorithms well known in the art. The operation of the system with respect to block caching is discussed in FIGS. 2-5 below.

Figure 2:
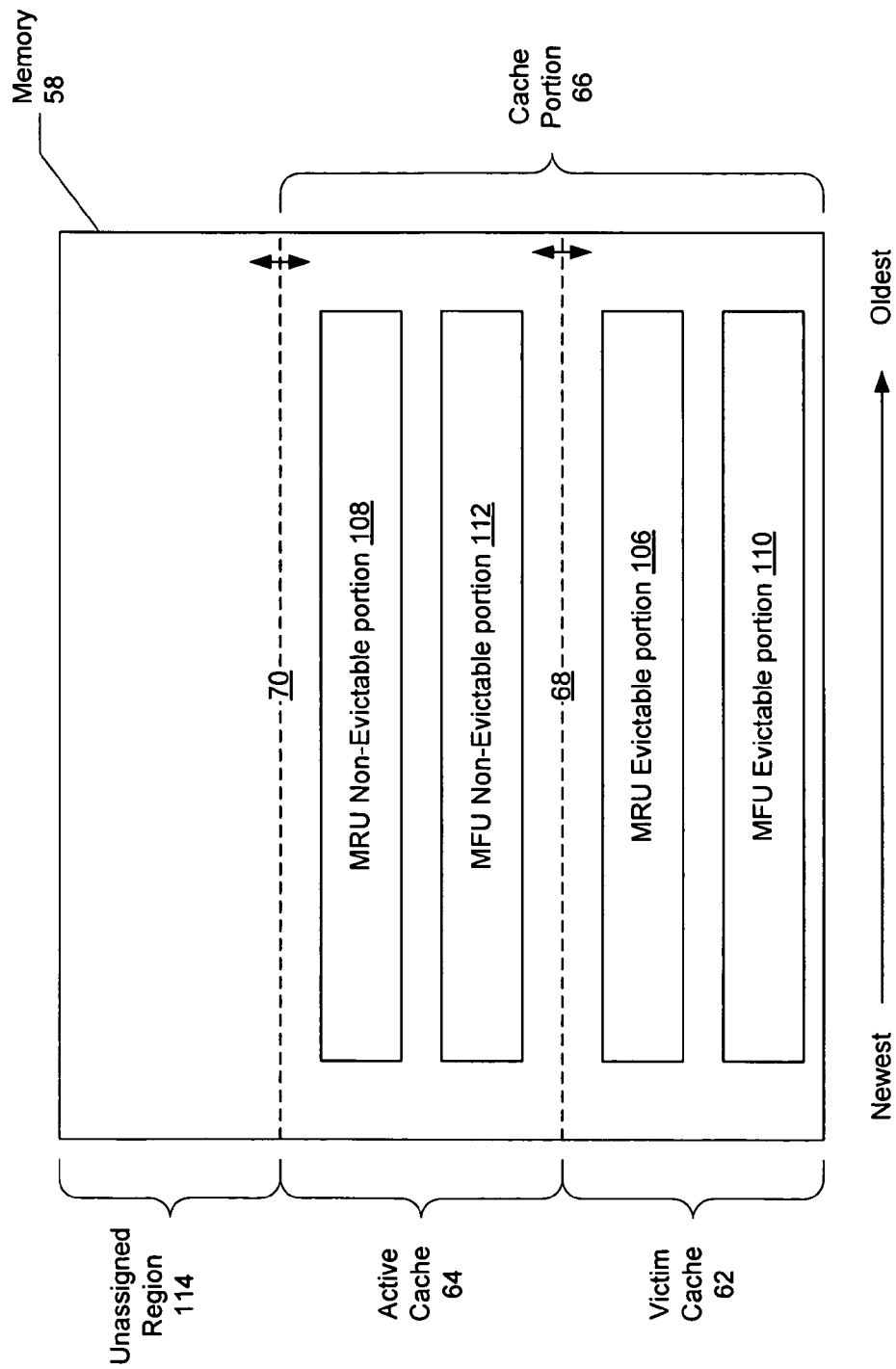
FIG. 2 shows a memory in accordance with one embodiment of the invention.

FIG. 2 shows a memory in accordance with one embodiment of the invention. As shown in FIG. 2, the memory (58) includes three logical regions: an active cache (64), a victim cache (62), and an unassigned region (114). In one embodiment of the invention, the active cache (64) includes blocks that are referenced by at least one other block (e.g., another block in the active cache (64)). Alternatively, in one embodiment of the invention, the victim cache (62) includes blocks that were formally in the active cache (64) but currently are not referenced by any other block. In one embodiment of the invention, the unassigned region (114) corresponds to a portion of the memory (58) that has not been assigned to either the active cache (64) or the victim cache (62). Those skilled in the art will appreciate that the unassigned region (114) may also contain data. In one embodiment of the invention, the size of each of the aforementioned portions of memory (58) may be dynamically changed as discussed below. The active cache (64) and the victim cache (62) are discussed in detail below.

In one embodiment of the invention, the active cache (64) includes two portions: a Most Recently Used (MRU) non-evictable portion (108) and a Most Frequently Used (MFU) non-evictable portion (112). In one embodiment of the invention, the MRU non-evictable portion (108) of the active cache (64) is configured to store blocks (i.e., blocks of data) that have at most one active reference (i.e., there is at most another block referencing the block). In contrast, the MFU non-evictable portion (112) of the active cache (64) is configured to store blocks that have two or more active references. Blocks in the MRU non-evictable portion (108) and the MFU non-evictable portion (112) may be moved to the victim cache (64), if all active references to the block subsequently become inactive.

In one embodiment of the invention, victim cache (62) includes two portions: a MRU evictable portion (106) and a MFU evitable portion (110). In one embodiment of the invention, the MRU evictable portion (106) and the MFU evitable portion (110) include blocks that have no active references. In one embodiment of the invention, the MRU evictable portion (106) of the victim cache (62) is configured to store blocks (i.e., a block of data) that had at most one active reference (i.e., there is another block referencing the block). In contrast, the MFU evictable portion (112) of the victim cache (62) is configured to store blocks that had two or more active references. In one embodiment of the invention, all of the blocks stored in the victim cache (62) are stored in compressed form. The compression of the data may be performed using compression algorithms well known in the art.

In one embodiment of the invention, each of the aforementioned portions of the active cache (64) and victim cache (62) maintain the blocks within their portions using linked-lists. Further, in one embodiment of the invention, the blocks in the linked list are organized from newest (i.e., most recently moved to the portion) to oldest (i.e., oldest block in the portion). Thus, in one embodiment of the invention, the head pointer for each of the linked lists points the newest block in the portion and the tail of the linked list is the oldest block in the portion. Those skilled in the art will appreciate that other data structures, instead of linked lists, may be used to organize the blocks in each of the aforementioned portions.

Those skilled in the art will appreciate that while the memory (58) shown in FIG. 2 is segmented into three logical regions and the data associated with any of the aforementioned regions may be located anywhere in the memory (58).

For example, blocks corresponding to blocks in the victim cache (62) may be interspersed with blocks corresponding to blocks in the active cache (64) and blocks corresponding to blocks in the unassigned region (114).

In one embodiment of the invention, the active cache (64) and the victim cache (62) shown in FIG. 2 may be expanded (i.e., the size of the active and/or victim cache may be increased at run-time) or reduced (i.e., the size of the active and/or victim cache may be decreased at run-time). Further, in one embodiment of the invention, the size of the blocks in each of the active cache and victim cache is variable, for example, between 512 bytes and 128 K byte.

Figure 3:
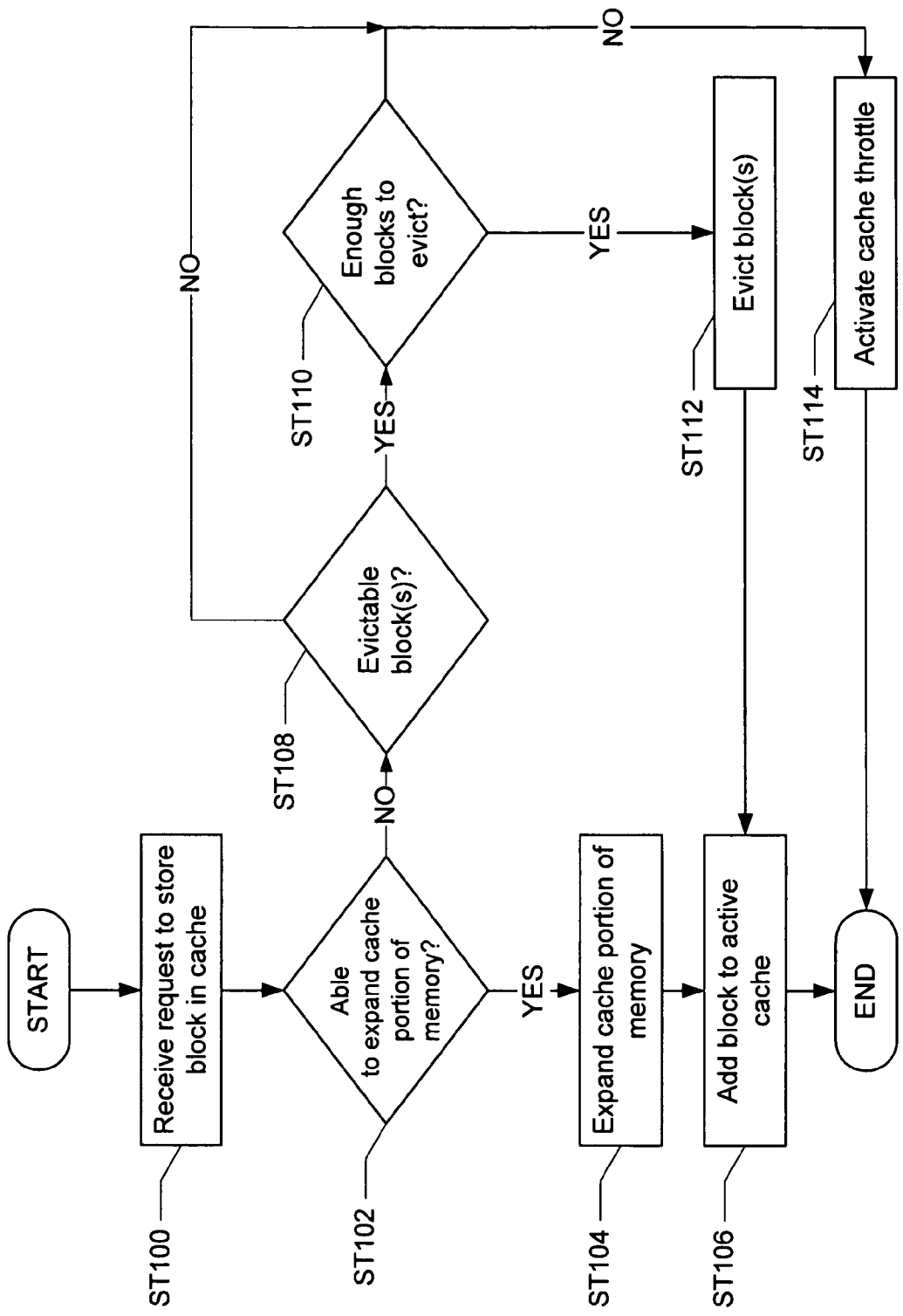
FIGS. 3-5 shows a flowchart in accordance with one embodiment of the invention.

FIG. 3 shows a flowchart describing the operation of the cache portion shown in FIG. 2 in accordance with one embodiment of the invention. More specifically, FIG. 3 describes the operation of the cache portion when there is insufficient unused space in the cache portion to cache the block. Initially, a request is received by the active cache to store a block (ST100). A determination is then made about whether the cache portion of the memory may be expanded (ST102). In one embodiment of the invention, the determination of whether to expand the cache portion of the memory is made based on the memory state (e.g., low memory, high memory). The memory state may be ascertained, for example, from a process that is concurrently monitoring of the system to determine whether the system is paging, low on swap, low on kernel heap space, etc. Typically, if the memory state is low, then the cache cannot be expanded.

In one embodiment of the invention, if memory state is low, the cache is signaled not to expand. Further, various processes in the system configured to decrease the size of the cache portion of the memory may also be activated at this time. Such processes may run in the background until the memory state is no longer low. Those skilled in the art will appreciate that if the cache portion of memory is increased, the boundary (70) between the cache portion (66) and unassigned region (114) is adjusted to decrease the size of the unassigned region (114).

Continuing with the discussion of FIG. 3, if the cache portion of memory can be expanded, the cache portion of memory is expanded to store the block (ST104) and the block is subsequently stored in the active cache (within the cache portion of memory) in the appropriate portion (ST106). However, if the cache portion of memory cannot be expanded, then a determination is made about whether any evictable blocks exist (i.e., are there any blocks on either of the evictable portions in the victim cache) (ST108). If there are blocks to evict, a subsequent determination is made about whether there are enough blocks to evict (ST 110). Said another way, if all blocks in the victim cache are evicted, then is their sufficient space to store the block. Those skilled in the art will appreciate that when blocks are evicted from the victim cache, the available space in cache portion of memory increases. Further, the newly available space in the cache portion of memory is available for use by the active cache.

If there are enough blocks to evict, then a sufficient number of blocks is evicted from the victim cache (ST112). As discussed above, the cache portion supports multi-block sizes, thus, in one embodiment of the invention, ST112 includes determining the minimal number of blocks in the victim cache that must evicted, such that there is space in the cache portion to store the new block (i.e., the block requested to be stored in ST100). In one embodiment of the invention, the blocks in the MRU evictable portion are evicted before the blocks in the MFU evictable portion. Thus, the victim cache first attempts to make space for the new block by evicting blocks on the MRU evictable portion. If all the blocks on the MRU evictable list have been evicted and sufficient space has not been freed by the eviction of all the blocks on the MRU evictable portion, then the victim cache proceeds to evict blocks on the MFU evictable portion until sufficient space has been freed to store the new block.

Continuing with FIG. 3, once the block(s) have been evicted, the new block is added to the active cache in the appropriate portion (as discussed above in FIG. 2) (ST106). However, if no evictable blocks exist or there is an insufficient number of evictable blocks (i.e., eviction of all the evictable blocks in the victim cache will not free up sufficient space to store the new block), then the method proceeds to activate a cache throttle (ST114). In one embodiment of the invention, the cache throttle corresponds to one or more processes executing in the system that attempt to decrease the number of requests to store blocks in the active cache. Once the cache throttle has been activated, the method ends and the block is not stored in the active cache.

Figure 4:
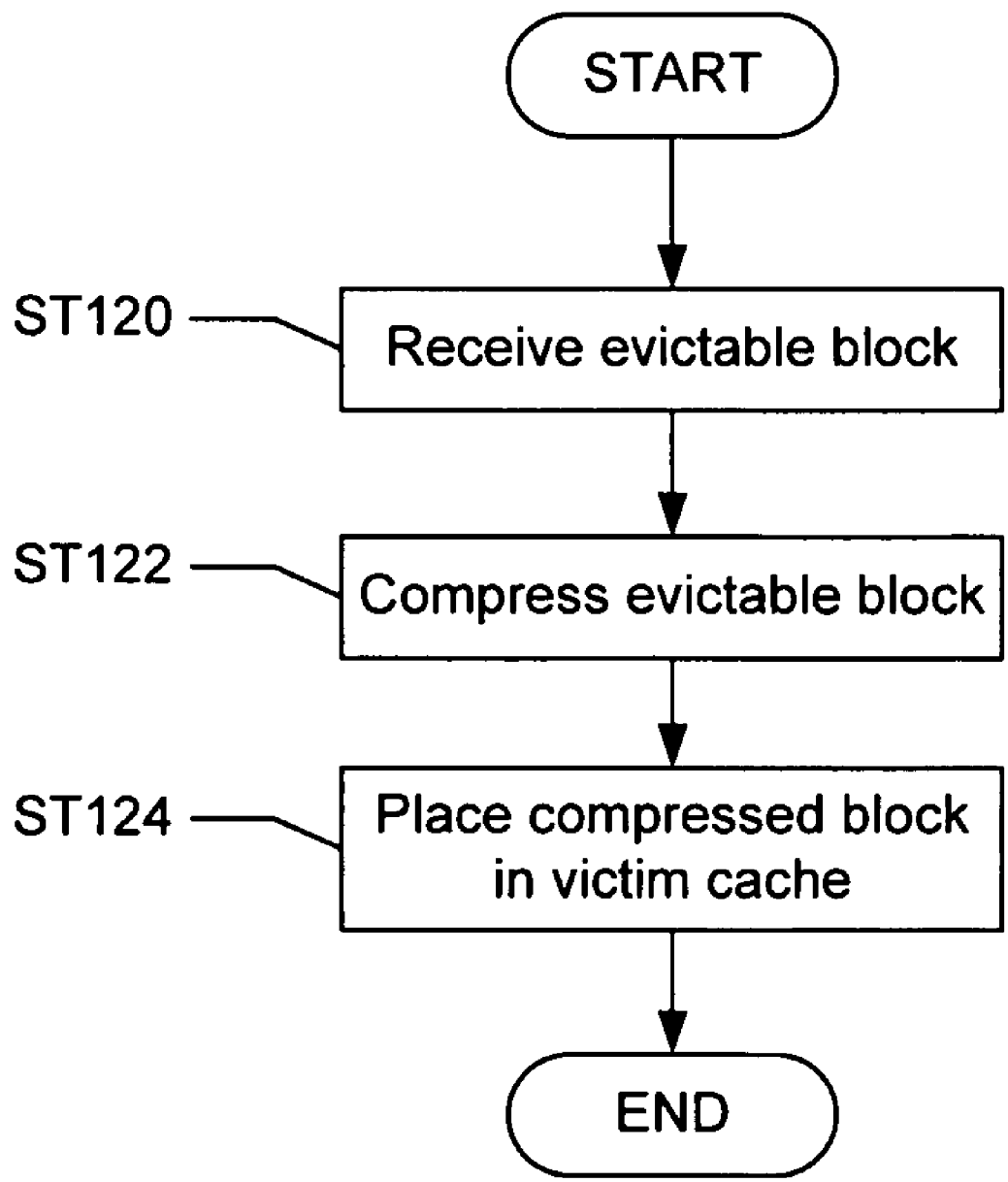

FIG. 4 shows a flowchart in accordance with one embodiment of the invention. More specifically, FIG. 4 shows the steps performed when a block is removed from the active cache in accordance with one embodiment of the invention. Initially, an evictable block is received from the active cache (ST120). In one embodiment of the invention, receiving the evictable block may correspond to receiving notification that the block is no longer referenced by any other block. Once the evictable block is received (or if notification is received), then the evictable block is compressed using a compression algorithm (ST122).

The compressed block is subsequently placed in the victim cache (ST124). In one embodiment of the invention, placing the compressed block in the victim cache corresponds to updating the necessary data structures in the system to reflect that the compressed block is now associated with the victim cache. Those skilled in the art will appreciate that the steps in FIG. 4 may be performed without changing the location of the block in the memory. Said another way, once all references to the block are removed, the system is notified and the block is subsequently compressed at its current location. Once compressed, the compressed block is then associated with the victim cache (e.g., attached to a linked list, for example, the MRU evictable portion or the MFU evictable portion).

Figure 5:
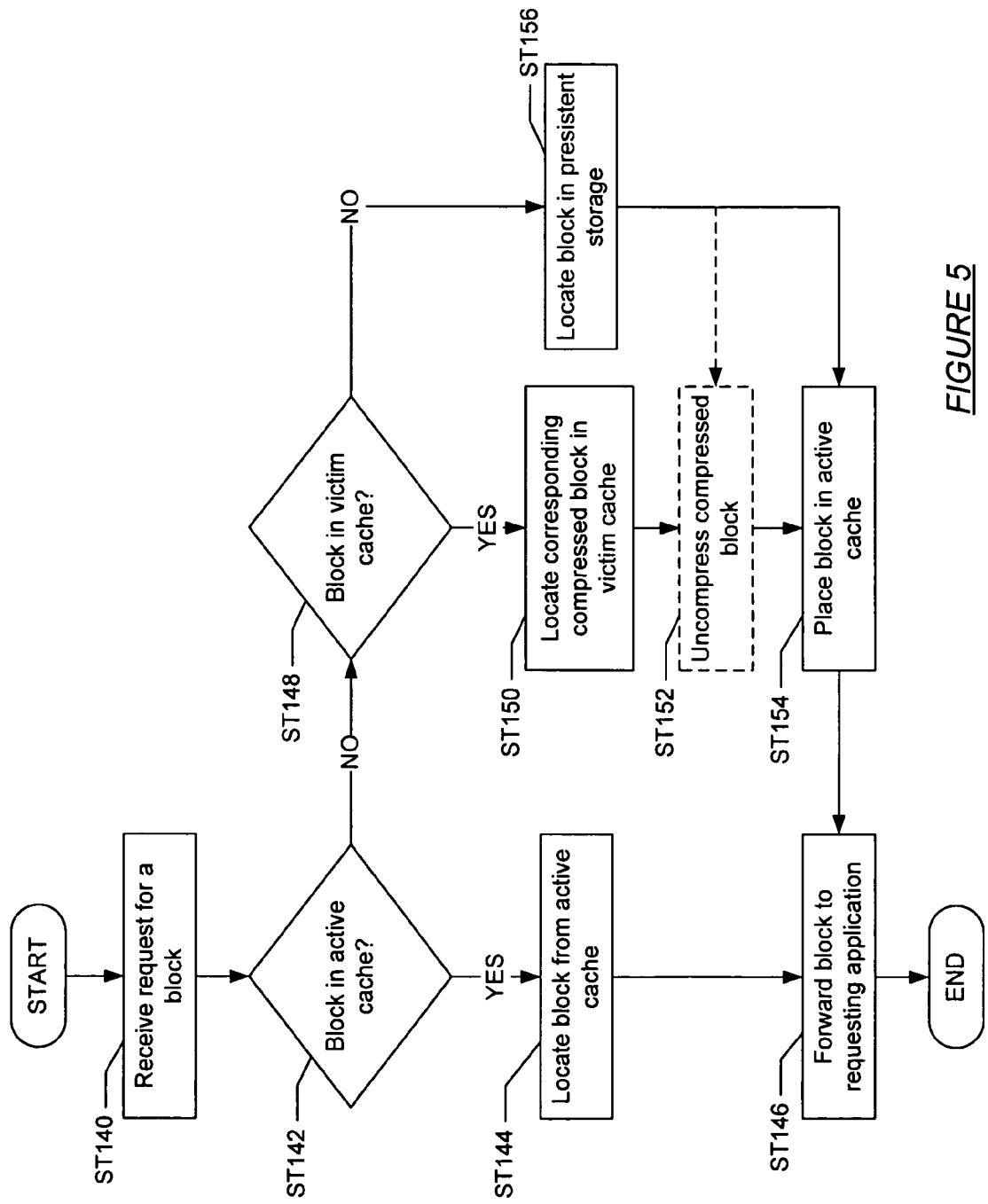

FIG. 5 shows a flowchart in accordance with one embodiment of the invention. More specifically, FIG. 5 shows a flow chart for obtaining a block in accordance with one embodiment of the invention. Initially, the file system (or a related process) receives a request for a block (ST140). The active cache is subsequently searched to determine whether the block is present (ST 142). If the block is present in the active cache, then the block is located in the active cache and the block (or a reference to the block) is forwarded to a process that initiated the request (ST146). Those skilled in the art will appreciate that ST142 and ST 144 may be performed simultaneously.

If the block is present in the active cache, then a determination is made about whether the block is in the victim cache (ST148). If the block is in the victim cache, then the block is located within the victim cache (ST150). Those skilled in the art will appreciate that ST142 and ST144 may be performed simultaneously. At this stage, the block, which is in a compressed form, may be decompressed (ST152) and then placed in (or associated with) the active cache (ST154). Alternatively, the block, which is in compressed form, may be placed in (or associated with) the active cache (ST154) without any decompression of the block. Once the block (compressed or decompressed) is placed in (or associated with) the active cache, the process proceeds to ST146.

If the block is not in the victim cache, then the block is located in persistent storage (ST156). In one embodiment of the invention, the block may be obtained from persistent storage in compressed form. If the block is in compressed form, the process may proceed to ST152 to be decompressed or, alternatively, the block may be forwarded (in compressed form) directly to ST154 without being decompressed. If the block is obtained in decompressed form, then the process proceeds to ST154.

Figure 6:
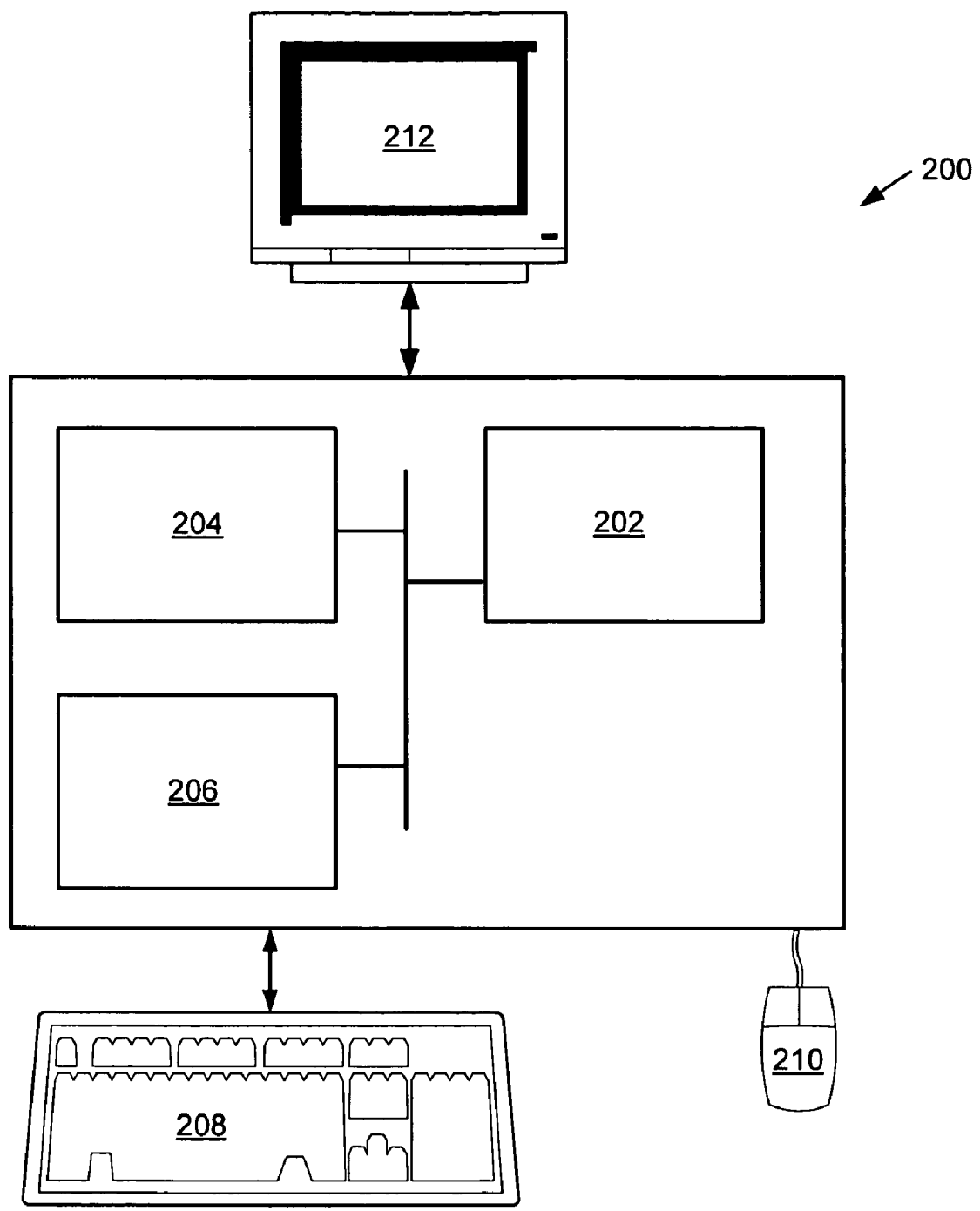
FIG. 6 shows a computer system in accordance with one embodiment of the invention.

The invention may be implemented on virtually any type of computer regardless of the platform being used. For example, as shown in FIG. 6, a networked computer system (200) includes a processor (202), associated memory (204), a storage device (206), and numerous other elements and functionalities typical of today's computers (not shown). The networked computer (200) may also include an input means, such as a keyboard (208) and a mouse (210), and an output means, such as a monitor (212). The networked computer system (200) is connected to a local area network (LAN) or a wide area network (e.g., the Internet) (not shown) via a network interface connection (not shown). Those skilled in the art will appreciate that these input and output means may take other forms. Further, software instructions to perform embodiments of the invention may be stored on a computer readable medium such as a compact disc (CD), a diskette, a tape, a file, or any other computer readable storage device.

Further, those skilled in the art will appreciate that one or more elements of the aforementioned computer (200) may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for caching a block of data, comprising:
receiving a request to store the block;
determining whether an active cache is able to expand;
if the active cache is able to expand:
expanding the active cache at runtime to obtain an expanded active cache, wherein expanding the active cache comprises increasing the size of the active cache, and
storing the block in the expanded active cache;
if the active cache is not able to expand:
determining whether evictable blocks are present in a victim cache, wherein the victim cache is structured to comprise a most recently used (MRU) evictable portion and a most frequently used (MFU) evictable portion, wherein the MRU evictable portion comprises blocks that previously had at most one active reference and currently have no active references, and the MFU evictable portion comprises blocks that previously had at least two active references and currently have no active references;
if evictable blocks are present in the victim cache:
evicting a sufficient number of the evictable blocks from the victim cache to facilitate storing the block in the active cache,
wherein the evictable blocks in the victim cache are compressed.

2. The method of claim 1, wherein the active cache comprises blocks that have at least one active reference.

3. The method of claim 1, wherein the victim cache supports multiple block sizes.

4. The method of claim 1, wherein determining whether to expand the cache comprises determining whether a memory state of a system in which the cache resides is low.

5. The method of claim 1, wherein the active cache and the victim cache are located in a single memory.

6. The method of claim 1, wherein evicting the sufficient number of the evictable blocks from the victim cache comprises:
evicting evictable blocks in a MRU evictable portion of the victim cache; and
evicting evictable blocks in a MFU evictable portion of the victim cache only if the sufficient number of evictable blocks is not present in the MRU evictable portion.

7. A system, comprising:
a memory, wherein the memory comprises an active cache and a victim cache, wherein the victim cache is structured to comprise a most recently used (MRU) evictable portion and a most frequently used (MFU) evictable portion, wherein the MRU evictable portion comprises blocks that previously had at most one active reference and currently have no active references, and the MFU evictable portion comprises blocks that previously had at least two active references and currently have no active references,
and wherein the system is configured to:
receive a request to store a block of data;
determine whether the active cache is able to expand;
if the active cache is able to expand:
expand the active cache at runtime to obtain an expanded active cache, wherein expanding the active cache comprises increasing the size of the active cache, and
store the block in the expanded active cache;
if the active cache is not able to expand:
determine whether evictable blocks are present in the victim cache;
if evictable blocks are present in the victim cache:
determine whether a total size of the evictable blocks is greater than or equal to a size of the block;
evict a sufficient number of the evictable blocks from the victim cache to facilitate storing the block in the active cache,
wherein the evictable blocks in the victim cache are compressed.

8. The system of claim 7, wherein a size of the block is within a range of 512 bytes and 128 K.

9. The system of claim 7, wherein the active cache comprises blocks that have at least one active reference.

10. The system of claim 7, wherein determining whether to expand the cache comprises determining whether a memory state of a system in which the cache resides is low.

11. The system of claim 7, wherein the active cache comprises blocks that have at least two active references.

12. The system of claim 7, wherein evicting the sufficient number of the evictable blocks from the victim cache comprises:
evicting evictable blocks in a MRU evictable portion of the victim cache; and
evicting evictable blocks in a MFU evictable portion of the victim cache only if the sufficient number of evictable blocks is not present in the MRU evictable portion.

13. A computer readable medium comprising instructions for performing a method for caching a block of data, the method comprising:
receiving a request for the block from a process;
determining whether the block is in an active cache;

returning the block to the process, if the block is in the active cache;

if the block is not in the active cache:

determining whether the block is in a victim cache, wherein the victim cache is structured to comprise a most recently used (MRU) evictable portion and a most frequently used (MFU) evictable portion, wherein the MRU evictable portion comprises blocks that previously had at most one active reference and currently have no active references, and the MFU evictable portion comprises blocks that previously had at least two active references and currently have no active references;

placing the block in the active cache and returning the block to the process, if the block is in the victim cache;

obtaining the block from persistent storage, if the block is not in the victim cache, wherein the block is in a compressed form, when the block is located in the victim cache.

14. The computer readable medium of claim 13, wherein the active cache and the victim cache are located in a single memory.

15. The computer readable medium of claim 13, wherein placing the block in the active cache comprises uncompressing the block prior to placing the block in the active cache.

16. The computer readable medium of claim 13, wherein returning the block to the process comprises returning a reference to the block.

* * * * *